United States Patent [19]

Klemann

[11] Patent Number: 5,230,913
[45] Date of Patent: Jul. 27, 1993

[54] FAT MIMETIC HAVING MINERAL CORE WITH FATTY COATING

[75] Inventor: Lawrence P. Klemann, Somerville, N.J.

[73] Assignee: Nabisco, Inc., Parsippany, N.J.

[21] Appl. No.: 663,211

[22] Filed: Mar. 1, 1991

[51] Int. Cl.$^5$ ............................................. A23D 9/00
[52] U.S. Cl. .................................. 426/97; 426/98; 426/531; 426/601; 426/804
[58] Field of Search .................. 426/97, 98, 531, 601, 426/804

[56] References Cited

U.S. PATENT DOCUMENTS

| | | | |
|---|---|---|---|
| 519,980 | 5/1894 | Winter . | |
| 1,264,592 | 4/1918 | Atkinson | 426/97 |
| 2,962,419 | 11/1960 | Minich | 167/81 |
| 2,978,330 | 4/1961 | Ferrari | 426/97 |
| 3,495,010 | 2/1970 | Fossel | 424/312 |
| 3,579,548 | 5/1971 | Whyte | 260/410.7 |
| 3,600,186 | 8/1971 | Mattson et al. | 99/1 |
| 3,637,774 | 1/1972 | Babayan et al. | 260/410.6 |
| 3,876,794 | 4/1975 | Rennhard | 426/152 |
| 3,992,556 | 11/1976 | Kovacs et al. | 426/97 |
| 4,005,195 | 1/1977 | Jandacek | 424/180 |
| 4,304,768 | 12/1981 | Staub et al. | 424/180 |
| 4,508,746 | 4/1985 | Hamm | 426/601 |
| 4,582,927 | 4/1986 | Fulcher | 560/201 |
| 4,619,705 | 10/1986 | Dixon et al. | 106/288 B |
| 4,734,287 | 3/1988 | Singer et al. | 426/41 |
| 4,797,300 | 1/1989 | Jandacek et al. | 426/549 |
| 4,830,787 | 5/1989 | Klemann et al. | 260/410 |
| 4,832,975 | 5/1989 | Yang | 426/607 |
| 4,840,815 | 6/1989 | Meyer et al. | 426/611 |
| 4,849,242 | 7/1989 | Kershner | 426/601 |
| 4,855,156 | 8/1989 | Singer et al. | 426/565 |
| 4,861,613 | 8/1989 | White et al. | 426/611 |
| 4,865,850 | 9/1989 | Shell et al. | 424/491 |
| 4,911,946 | 3/1990 | Singer et al. | 426/658 |
| 4,915,974 | 4/1990 | D'Amelia et al. | 426/611 |
| 4,927,659 | 5/1990 | Klemann et al. | 426/611 |

FOREIGN PATENT DOCUMENTS

| | | |
|---|---|---|
| 0233856 | 2/1987 | European Pat. Off. . |
| 0323529 | 12/1987 | European Pat. Off. . |
| 0322027 | 12/1988 | European Pat. Off. . |
| 0352907 | 6/1989 | European Pat. Off. . |
| 0380225 | 1/1990 | European Pat. Off. . |
| 57-129672 | 8/1982 | Japan . |
| 61-37054 | 2/1986 | Japan . |
| 8905587 | 11/1988 | World Int. Prop. O. . |

OTHER PUBLICATIONS

Booth, A. N., and Gros, A. T., J. Amer. Oil Chem. Soc. 40:551-553 (1963).
Carroll, K. K., J. Nutr. 64: 399-410 (1958) at 408.
Deuel, H. J., The Lipids, vol. II, Interscience Publishers, 1955, pp. 218-220.
Goodman and Gillman, Pharmacological Basis of Therapeutics, 7th ed., Macmillan Pub. Co., N.Y. 1985, pp. 1002-1003.
Gottenbos, J. J., Chapter 8 in Beare-Rogers, J., ed., Dietary Fat Requirements in Health and Development, A.O.C.S. 1988 p. 109.
Hamm, D. J., J. Food Sci. 49:419-428 (1984).
Mead, J., et al., Lipids, Plenum, N.Y., 1986, p. 459.
Stryker, W. A., Arch. Path. 31; 670-692 (1941).
Perry, J. H., Ed., Chemical Engineers: Handbook, 4 ed., McGraw-Hill, N.Y., 1963, pp. 21-51.
Smith, W. H., Technology, Production and Management, "Biscuits, Crackers and Cookies", vol. 1, Applied Science Publishers Ltd., N.Y., 1972, pp. 101-109.
Haumann, B. E. J. Amer. Oil Chem. Soc. 63: 278-288 (1986).
LaBarge, R. G., Food. Tech. 42: 84-90 (1988).

*Primary Examiner*—Jeanette Hunter
*Assistant Examiner*—Helen F. Pratt

[57] ABSTRACT

Mixtures comprising fat-insoluble, inorganic particulates and a surface layer of a fatty material are employed in edible compositions as low calorie fat substitutes. The fatty material is any edible lipid, including triglycerides, fatty acids, monoglycerides, diglycerides, other fat-like materials including sucrose polyesters. The fatty material can be less than fully digestible. Preferably, one or both of the particulate and fatty materials are nutritious. In one embodiment, calcium carbonate particles are coated with oleic acid. The particles will preferably have average diameters of less than 5 microns, and desirably average less than 1 micron. Methods of making and using the low calorie fat mimetics and food products incorporating them are disclosed.

22 Claims, No Drawings

FAT MIMETIC HAVING MINERAL CORE WITH FATTY COATING

BACKGROUND OF THE INVENTION

This invention relates to the use of low calorie or no calorie fat mimetics in total or partial replacement of the highly caloric triglyceride fats and oils normally found in edible compositions.

Dietary fat is the most concentrated source of energy of all the nutrients, supplying 9 kcal/gram, about double that contributed by either carbohydrate or protein. Compared to minerals, such as calcium carbonate, the normal dietary fat is more often associated with negative health implications. The amount of fat in the American diet has increased in the last 60 years by about 25% (Mead, J., et al. Lipids, Plenum, New York, 1986, page 459), so that fats now provide approximately 40% (or more) of the daily caloric intake.

Because fats are high in calories and because some fats have been associated with health risks when consumed in large quantities over time, a number of national advisory committees on nutrition have recommended that the total amount of fat in the diet be reduced significantly (Gottenbos, J. J., chapter 8 in Beare-Rogers, J., ed., *Dietary Fat Requirements in Health and Development*, A.O.C.S. 1988, page 109).

Fat is not, however, without health and nutrition benefits unique to itself, and it would be desirable to retain these. Fat contributes to the palatability and flavor of food, since most food flavors are fat-soluble, and to the satiety value, since fatty foods remain in the stomach for longer periods of time than do foods containing protein and carbohydrate. Furthermore, fat is a carrier of the fat-soluble vitamins, A, D, E, and K, and the essential fatty acids, which have been shown to be important in growth and in the maintenance of many body functions. It would be desirable to provide a way to produce food substances that provide the nutritional, as well as functional and organoleptic benefits of fats while greatly reducing the calories. It would be further desirable to provide a fat mimetic of this type which would be of a nature which could be injested in sufficiently large quantities to make it possible for consumers to significantly reduce their total fat intake.

The most abundant group of fats are esters of fatty acids with the trihydroxy alcohol, glycerol. Early studies reported that fats having high melting points were less digestible (Deuel, H. J., *The Lipids*, vol. II, Interscience Publishers, 1955, pages 218 to 220). Later investigators questioned the relationship between digestibility and melting points, and scrutinized instead the chain lengths and degree of unsaturation of fatty acid substituents; (Carroll, K. K., *J. Nutr.* 64: 399–410 (1957) at 408). (Hashim, S. A., and Babayan, V. K., *Am. J. Clin. Nutr.* 31: S273–276 (1978)).

Triglycerides having stearic acid in combination with medium chain substituents have been suggested as low calorie fats (European Published Pat. App. No. 322,027 to Seiden). Low calorie triglyceride mixtures having stearic acid at the 1-position and medium and unsaturated residues in the other positions have also been suggested (U.S. Pat. No. 4,832,975 to Yang).

Unfortunately, these fats, even if effective in reducing calories, are not known to reduce the total fat intake. And, triglycerides high in stearic acid tend to be high melting. The production of these tailored triglycerides can also be difficult for several reasons including the tendency of some processes to produce large amounts of tristearin, the melting point of which is so high that it causes a waxy mouthfeel if used in amounts of even two percent in products like margarine. Tristearin is a solid at room temperature; the alpha form is a white powder that melts at 55° C., which, on solidification, reverts to the beta form that melts again at 72° C.

The quest for low calorie fats has largely been to structurally re-engineer triglycerides. The goal has been to retain their conventional functional properties in foods, while reducing their susceptibility toward hydrolysis or subsequent absorption during digestion. To this end, the glycerol moiety been replaced with alternate polyols (e.g., pentaerythritol in U.S. Pat. No. 2,962,419 to Minich, or sugars in U.S. Pat. No. 3,600,186 to Mattson and Volpenhein and U.S. Pat. No. 4,840,815 to Meyer, et al.); the fatty acids have been replaced with alternate acids (e.g., branched acids as described in U.S. Pat. No. 3,579,548 to Whyte); groups have been inserted between the glycerol and the fatty acids (e.g., ethoxy or propoxy groups in U.S. Pat. No. 4,861,613 to White and Pollard); the ester bonds have been reversed (e.g., malonates in U.S. Pat. No. 4,482,927 to Fulcher and trialkoxytricarballylates in U.S. Pat. No. 4,508,746 to Hamm); and the ester bonds have been replaced by ether bonds (Canadian Pat. No. 1,106,681 to Trost).

More radical departures from restructured triglycerides employ materials developed from unrelated chemistry. Mineral oil was suggested as an edible fat replacement as early as 1894 (U.S. Pat. No. 519,980 to Winter), and numerous other compounds, including polymers such as polyglucose and polymaltose (U.S. Pat. No. 3,876,794 to Rennhard), polyoxyalkylene esters (U.S. Pat. No. 4,849,242 to Kershner), and polyvinyl alcohol esters (U.S. Pat. No. 4,915,974 to D'Amelia and Jacklin), have been considered. (For recent reviews, see Hamm, D. J., *J. Food Sci.* 49: 419–428 (1984), Haumann, B. J., *J. Amer. Oil Chem. Soc.* 63: 278–288 (1986) and LaBarge, R. G., *Food Tech.* 42: 84–90 (1988).)

Nondigestible or nonabsorbable fat replacements have proved disappointing when tested in feeding trials, where gastrointestinal side effects occurred, in some cases so extreme that frank anal leakage was observed. Nondigestible fats appear to act as a laxative and are expelled from the body, eliciting foreign body reactions like those early documented for mineral oil (Stryker, W. A., *Arch. Path.* 31: 670–692 (1941), more recently summarized in Goodman and Gilman's *Pharmacological Basis of Therapeutics*, 7th ed., Macmillan Pub. Co., N.Y. 1985, pp. 1002–1003). In the U.S.D.A.'s assessment of the caloric availability and digestibility of a series of new-type fats in the 1960's (e.g., amylose fatty acid esters, diglyceride esters of succinic, fumaric, and adipic acids, and polymeric fats from stearic, oleic and short-chain dibasic acids; see Booth, A. N., and Gros, A. T., *J. Amer. Oil Chem. Soc.* 40: 551–553 (1963) and the references cited therein), rats fed the experimental fats exhibited undesirable gastrointestinal side effects similar to what had already been observed with mineral oil consumption by people. In several of the balance studies, the diarrhea was so extreme that digestibility coefficients could not be calculated (ibid., Table I, p. 552).

The laxative side effect has shown to be so pronounced that it still persists for liquid sucrose polyesters even after blending them with a fiber such as microfibrillated cellulose or a fully hydrogenated sucrose polyester of soybean oil fatty acids. (European Pat. App.

352,907 to Howard and Kleinschmidt) Even in the case of plastic sucrose polyesters, the use of cellulose is used by these researchers at seven percent. That disclosure further noted that cellulose of this type is known for use in reduced-calorie foods including jellies and spreads and as thickeners, flavor carriers or suspension stabilizers in other foods. The use of cellulose either alone or with sucrose polyesters, adds food weight without adding food value. Indeed, the combination could, if precautions are not taken, remove vitamins, minerals and essential fatty acids from the diet. What is desired is a reduced-calorie fat substitute which is more in line with traditional nutrition rationale and is free of novel nutritional interactions which may not be fully understood and could affect the normal cascade of biochemistry.

Among other attempts to reduce calories by adding nutritionally inert additives is the disclosure of Yokoyama, Fraser and Khatri in U.S. Pat. No. 4,619,705 which asserts that polydextrose and/or microcrystalline cellulose can be employed to advantage in formulating a spread similar to peanut butter. The use of high-surface-area, small particles of microcrystalline cellulose is said to bind oil too tightly and particle sizes are kept to above 5 microns. Polydextrose is disclosed as effective because its density and smooth surface characteristics reportedly absorb or immobilize little oil. When polydextrose is employed it is sometimes desired to add a base such as calcium or magnesium hydroxides, oxides or carbonates. These additives, however, are not fat mimetics because they are not used as the sole fatty component in a food—solely as fillers for an existing fat. It would be more desirable to have a material which was effective not only as a filler material, but which could function also as a true substitute for natural fats. In European Pat. App. No. 380,225, Hendrick and Reimer disclose coating a core material with a digestible fat. It would, however, be desirable to enable the use of mineral cores which could provide nutrition as well as increased economy.

In U.S. Pat. No. 4,865,850, Shell and See disclose the administration of fat absorbing particles to remove fat from the gastrointestinal tract. The particles comprise a non-biodegradable material such as cross-linked collagen coated with a fat receptive material such as bile and have diameters of from 2 to 50 microns. This material is not, however, a fat substitute. It is a non-nutritional fat scavenger.

A number of other remedies have been recommended to combat the anal leakage observed when sucrose polyesters are ingested (e.g., employing cocoa butters, U.S. Pat. No. 4,005,195 to Jandacek, incorporating saturated fatty groups, Eur. Pat. App. No. 233,856 to Bernhardt, or mixing residues, U.S. Pat. No. 4,797,300 to Jandacek, et al.), and dietary fiber preparations have been incorporated into polysaccharide and/or polyol-containing foodstuffs to help inhibit the diarrheal effect (U.S. Pat. No. 4,304,768 to Staub et al.).

The sucrose polyesters and other non-digestible fat substitutes tend to have a stool softening effect despite taking precautions. Polyglycerol and polyglycerol esters, suggested as fat replacements by Babayan and Lehman (U.S. Pat. No. 3,637,774), have been suggested for use as fecal softening agents as well (U.S. Pat. No. 3,495,010 to Fossel). It would be desirable to have fat substitutes which do not cause anal leakage or stool softening. Partially digestible fat replacements have also been suggested as a better approach to avoid or diminish the known problems associated with nondigestible and non-nutritious fat substitutes. ( U.S. Pat. No. 4,830,787 to Klemann and Finley; U.S. Pat. No. 4,849,242, cited above; and U.S. Pat. No. 4,927,659 to Klemann, et al.).

In another approach to fat replacements, Singer, Yamamoto and Latella describe a fatty tasting particulated whey protein in U.S. Pat. No. 4,734,287. Similarly, in European Pat. App. No. 323,529, they describe macrocolloids derived from plant, microbial and other animal sources, and in WO 89/05587, Singer along with Chang, Dunn, and Hatchwell, disclose a particulated complex having casein cores with shells of egg white protein. In U.S. Pat. No. 4,855,156, Singer, Wilcox and Podolski, prepare frozen desserts with these materials. And, in U.S. Pat. No. 4,911,946, Singer, Chang, Tang and Dunn, disclose a carbohydrate cream substitute which comprises macro-colloidal particles of suitable carbohydrates. In each of these cases, the particle sizes are maintained under about two microns, and the products are too heat sensitive to be of use in many food applications. It would be advantageous to have a fat mimetic which had enhanced heat stability, and to preferably withstand the rigors of normal food heating processes.

It would be desirable to have a selection of yet further fat mimetic materials which could be used to impart nutritional and functional properties to foods and to the diet.

SUMMARY OF THE INVENTION

An object of the present invention is to provide a new group of low calorie fat mimetics and food compositions incorporating them.

It is another object of the present invention to provide a new group of fat mimetics which are extremely low in caloric content, yet do not result in the extreme laxative side effects prevalent with non-digestible liquid oils such as sucrose polyesters.

It is a further object of this invention to provide reduced calorie fats having excellent organoleptic properties and functional characteristics useful in a wide variety of foods.

These and other objects are accomplished by the present invention which provides food products which are improved due to the presence of one or more new fat mimetics which are mixtures comprising fat-insoluble, inorganic particles and a surface covering layer of a fatty material.

The fatty material is any edible lipid including non-digestible, partially-digestible and fully-digestible fats and fat substitutes. Among these are triglycerides, fatty acids, monoglycerides, diglycerides, other fat-like materials including sucrose polyesters, and mixtures of any of these.

It is preferred that at least one of the components of the fat mimetic, i.e., the particulate material and the fatty material, is nutritious. One preferred embodiment employs calcium carbonate particles coated with a continuous layer of oleic acid. The particles will preferably have average diameters of less than 5 microns, and desirably average less than 1 micron.

Methods of preparing and using the low calorie fat mimetics to prepare various food products are also disclosed.

DETAILED DESCRIPTION OF THE INVENTION

In the practice of this invention, mixtures comprising fat-insoluble, inorganic particulates having a surface covering layer of a fatty material are employed in edible compositions as low calorie fat substitutes. These fat substitutes, or fat mimetics as I prefer to identify them because of their fatty character and their ability to simulate the characteristics of naturally fats, are employed in a wide variety of food products in full or partial replacement of the content of fat which is naturally or normally present. Thus, the food products of this invention comprise: a fat mimetic composition comprising particulate fat-insoluble inorganic material coated with an edible fatty material, and at least one other food ingredient.

The fatty material can be any edible lipid including triglycerides, fatty acids, monoglycerides, diglycerides, acetylated monoglycerides, acetylated diglycerides, triglycerides, salts of fatty acids, sucrose polyesters, neoalkyl esters, polyglycerol esters, malonate esters, propoxylated glycerols, retrofats, carboxy/carboxylates, polyvinyl alcohol esters, and other fatty materials, and mixtures of any of these in any combination. Natural triglycerides rich in highly desirable or essential fatty acids, such as oleic, linoleic, linolenic, or eicosapentaenoic acid can be used to advantage and provide a unique array of desirable properties in addition to their nutritional benefits. In addition, triglycerides bearing fatty acids having beneficial attributes such as those associated with conjugated linoleic acid isomers, medium chain triglycerides, and the like, can be used to advantage.

Among the natural triglycerides which can be used as either the fatty material or as sources from which free fatty acids are derived for use as the fatty material for coating the inorganic component, are natural or hydrogenated oils selected from the group consisting of soybean, sunflower, peanut, safflower, olive, sesame, rice bran, canola, babassu, coconut, palm kernel, palm, rapeseed, cottonseed, corn and butter oils, and fractions thereof, and mixture of any of these.

The fatty acid or mixture of them may be derived from any synthetic or natural organic acid including, but not limited to, saturated acids including palmitic, linoleic, linolenic, oleic, stearic, arachidic, behenic, lignoceric, cerotic, montanic, melissic, and unsaturated acids including palmitoleic, vaccenic, eleostearic, arachidonic, nervonic, eicosapentaenoic, docosatetraenoic, docosapentaenoic, docosahexaenoic, and like acids, in addition to others not listed. In one embodiment, the fatty acids will be predominantly, as much as 80% or higher, 18 carbon fatty acids. In some embodiments it is preferred to employ a mixture of fatty acids containing at least 92% of 18 carbon fatty acids. Preferred mixtures of this type contain linoleic, linolenic, oleic, and/or stearic acids.

In one embodiment, the free fatty acids comprise a mixture containing at least 25% stearic acid.

Not mentioned specifically above, but of use in the present invention are the 2 to 14 carbon fatty acids, both saturated and unsaturated. The oils, fats, or waxes may be hydrogenated, as desired, before or after incorporation into the low calorie fat mimetics of this invention. The mixtures can contain amounts of short, medium and/or long chain fatty acids to the extent which these can be tolerated without unduly affecting the physical properties of the fat, or the caloric reduction. For example, some fat mimetics desirably contain up to 75% short and medium chain triglycerides. Others will contain predominantly long chain fatty acids.

The particles of inorganic material can be composed of any edible inorganic material which is capable of being prepared or obtained in a suitable particle size. The inorganic material is preferably employed in the form of primary particles as opposed to aggregates. The material, e.g. at least 90% by weight should comprise primary particles, will have an average particle size of less that 50 microns and greater than 0.005 microns. The particles will preferably have average diameters of less than 5 microns, desirably average less than 1 micron, and above 0.05 microns. In one embodiment, the average particle size is within the range of from 0.1 to 4.0 microns. Desirably, at least 50% of the weight of the particles is present as primary particles. It is preferred to maintain the aggregates to less than 10% of the weight of the inorganic material. And, where present the aggregates should meet the particle size limitations above. In one embodiment, at least 90% by weight of the particles comprise primary particles and the fat-insoluble inorganic material comprises calcium carbonate and the fatty material is at least 90% eighteen carbon fatty acids and the caloric content of the fat mimetic is less than 0.5 kilocalories per gram.

The inorganic material can be a naturally occurring or manufactured particulate. It desirably has some nutritional benefit; however, this is not required. It can, for example, be a member selected from the group consisting of calcium carbonate, magnesium carbonate, magnesium hydroxide, magnesium trisilicate, aluminum silicate, monocalcium phosphate, dicalcium phosphate, tricalcium phosphate, titanium dioxide, aluminum oxide, alumina trihydrate, and mixtures of any of these.

The minerals of greatest utility are those which contain divalent metal cations such as calcium and magnesium because they tend to form divalent salts with fatty acids either during the preparation process or during digestion of triglycericdes in the body. This has benefit in terms of the physical properties of the fat mimetics and the ability to better control caloric availability of other fats consumed at the same time, whether as part of the same food or as distinct parts of a meal.

In addition to the minerals which are water-insoluble, water-soluble salts can be used to advantage in foods which contain little or no water. Among the advantages are the use of these water-soluble salts for their nutritional value, say for the purpose of providing a balanced mineral supplement. When water-soluble salts are employed, the foods should have water activities lower than the equilibrium value of the salts.

One preferred material is calcium carbonate which can be freshly precipitated or ground from any of its naturally occurring sources such as chalk, oyster shells, limestone, and the like. In addition, calcium is present naturally combined with magnesium, another preferred material, as a mixed carbonate, in the mineral dolomite. It can be used in any of its various crystalline forms, which can be used to advantage to control various physical properties of the fat mimetics.

Minerals are advantageous from a number of standpoints, including their availability in quantity, low cost and known properties. Among the suitable minerals, in addition to those mentioned above, are: chabazite, kaolinite, epsonite, forsterite, gehlenite, glauberite, grossularite, gypsum, hydrotalcite, feldspar, leucite, magnesite, muscovite, natrolite, scolecite and sodalite. These materials can be employed alone or in combination with others on this list or other suitable components.

When obtained by grinding, the inorganic material can be ground in the presence of a protective colloid as is effective in increasing the yield of primary particles and decreasing the number of aggregates.

The fat mimetics of this invention are prepared by combining the inorganic component and the fatty component in any manner effective to achieve the desired particle size, the desired ratio of the two components, and an effective uniform coating over substantially all of the particles. The ratio of fatty material to inorganic material is preferably no more than sufficient to provide a coating 10 molecules thick over the surface of the particles. Coatings of this thickness will be less than about 5 and preferably less than about 1% of the weight of the fat mimetic. In other embodiments it is desired to obtain a coating of 2 molecules thick or less. In yet others, thickness of the coating is not of great concern and may amount from 1% to 10% or higher of the weight of the fat mimetic.

One method for preparing the fat mimetics of this invention entails simply grinding the inorganic component with the fatty material for a time sufficient to provide a uniform coating. If desired, a solvent can be employed during the grinding to facilitate uniformity and economy of coating. Following coating, any residual solvent is removed by heat alone or in combination with vacuum. In some embodiments, grinding is not required where the inorganic material is either freshly made or is inherently or otherwise free of a tendency to agglomerate.

It is an advantage that the physical properties of the fat mimetics of the invention can be varied over wide ranges by judicious manipulation of the parameters mentioned above. Formulations for chocolate or confectionery applications, for example, can employ fatty mimetics which, in the food product, yield high-flow-temperature mixtures, salad oils can employ fat mimetics yielding medium-flow-temperature mixtures that do not readily crystallize upon refrigeration, margarines and shortenings can employ those that yield from high to low flow temperature mixtures, bakery products may employ fat mimetics which are stable to oxidation on storage. By flow temperature is meant the temperature at which a one centimeter cube of the material, upon heating and supporting a one 0.1 gram weight begins to flow. For purposes of definition, low temperatures will be within the range of up to 40° F., medium flow temperatures are within the range of from 40° to 70° F. and high flow temperatures are above 70° F., but preferably below 98° F.

The choice, number and manner of incorporation of the various types of fatty materials are all selected to affect the biological, as well as the physical, properties of the compounds. Where any of the fatty materials are metabolized, the calorie value of the fat mimetic will increase. In some cases, it is desirable to provide fatty materials which, in the body will provide a highly desirable or essential fatty acid such an an acid selected from the group of oleic, linoleic, linolenic and eicosapentanoic acids and mixtures of these. Preferred fatty materials for the coating are only partially digestible and deliver less than 9 kcal/gram, preferably below 6 kcal/gram, more narrowly between 0.1 and 5.0 kcal/gram upon being metabolized.

The low calorie fat mimetics of this invention may be incorporated either alone, or in combination with another fat and/or fat mimetic, into any food composition comprising, or, used in conjunction with any edible material. Other fats and fat mimetics include any of those disclosed above as well as others suitable for food use.

In one embodiment, the low calorie fat mimetics of this invention are mixed with natural oils such that the ratio of unsaturated to saturated residues in the resulting blend lies between 1 and 10, more narrowly between 2 and 6, and even more narrowly between 3 and 5. In one embodiment, the polyunsaturated to saturated ratio is above 10; in another, between 10 and 25. It is an advantage of the invention that the ratio of polyunsaturates to saturates can be increased while still maintaining a desirable degree of plasticity due to the presence of the inorganic solids. Additionally, this ratio can be increased even more by blending the fat mimetic with a highly polyunsaturated oil such as safflower, sunflower, sorghum, soybean, peanut, corn, cottonseed and sesame oils. Also, the use of a highly polyunsaturated fatty material, such as one of the oils just mentioned or a polyunsaturated fatty acid or fatty acid fraction derived from one such oils, as the fatty material which coats the inorganic material, can be used to advantage.

It is a further advantage of the invention that desirable physical properties can be achieved in foods containing high concentrations of naturally-occurring cis monounsaturates by blending the fat mimetics with oils rich in these, such as corn, soybean, canola, peanut, and cottonseed oils, and tallow, lard, and mixtures and fractions of these. Alternatively, it is possible to employ fatty acids or mixtures of fatty acids from fractions of one or more of these oils.

The term "food" is broad and includes anything edible, whether or not intended for nutrition, e.g., it can be an additive such as an antioxidant for fats or oils, an antispatter agent, an emulsifier, a texture modifier such as a plasticizer for chewing gum, a component for cosmetics, or other minor functional ingredient such as a carrier or diluent for use in flavorings, pharmaceuticals, and the like.

Representative of fat-containing food products which can contain, in addition to other food ingredients, the low calorie fat mimetics of this invention in full or partial replacement of natural or synthetic fat are: frozen desserts, e.g., frozen novelties, ice cream, sherbet, ices, or milk shakes; salad dressings, mayonnaises and mustards; dairy or non-dairy cheese spreads; margarine substitutes or blends; flavored dips; flavored bread or biscuit spreads; filled dairy products such as filled cream or filled milk; frying fats and oils; cocoa butter replacements or blends; candy, especially fatty candies such as those containing peanut butter or chocolate; reformed and comminuted meats; meat substitutes or extenders; egg products and substitutes; nut products such as peanut butter; vegetable and fruit products; pet foods; whipped toppings; compound coatings; coffee lighteners, liquid and dried; puddings and pie fillings; frostings and fillings; chewing gum; breakfast cereals; bakery products, e.g., cakes, breads, rolls, pastries, cookies, biscuits, and savory crackers; and mixes or ingredient premixes for any of these. In one embodiment the fat mimetic composition is suspended in an oil phase, which can comprise a normally liquid vegetable oil. This food product can have a caloric content of less than 8 kilocalories per gram, e.g. from 0.5 to 6.5 kilocalories per gram. In some food products of the invention, the fat mimetic per se has a caloric content of less than 1 kilocalorie, more narrowly less than 0.5 kilocalorie, per gram. The fat mimetics of this invention may also be employed in any flavor, nutrient, drug or functional additive delivery systems.

Representative of food products are: baked foods, such as cookies, snack products, crackers, biscuits, cakes and the like which all contain at least a flour or starch component in addition to the fat mimetic of this invention; other snack products which also contain at least a flour or starch component in addition to the fat mimetic; emulsion products, such as margarine, salad dressing and mayonnaise which all contain emulsions having a fat phase including the fat mimetic and an aqueous phase; candies and confections which contain a sweetener such as sugar or aspartame in addition to the fat mimetic; and dairy product substitutes which contain a dairy protein such as whey, casein or caseinate, or the like in addition to the fat mimetic. Among the baked food products are those further comprising flour selected from the group consisting of rice, wheat, and corn.

In one of its broad aspects, the invention provides a process for preparing a food product with reduced calories comprising adding a fat mimetic of the invention to at least one other food ingredient in the preparation of the food. The fat mimetic can be in total or partial substitution of the normal or natural fat content. Typical food ingredients will be selected from the group consisting of protein, carbohydrates, fats, nutrients and flavors. These ingredients are typically added in the form of flours, meals, fruits, dried fruits, vegetables, dried vegetables, meats, dried meats, starches, spices, dried milk solids, sugars, acidulents, buffers, emulsifiers, stabilizers, gums, hydrophilic colloids, salts, antioxidants, colors, preservatives and the like. In one embodiment the method of the invention includes the step of blending the fat mimetic with a vegetable or animal fat to replace at least 10% of the weight of the fat. In another, it includes the step of blending the fat mimetic with a sweetener. In another aspect, it includes blending the fat mimetic with other ingredients including at least one flour or starch ingredient and heating the resulting blend. In another embodiment, the method further includes the step of cooling the reduced caloric food product.

The following examples are presented to further illustrate and explain the present invention and should not be taken as limiting in any regard. Unless otherwise indicated, all parts and percentages are by weight, and are based on the weight at the particular stage of the processing being described.

EXAMPLE 1

Microparticulated $CaCO_3$, Calcium oxide (120 g, 2.14 mole) sodium carbonate (238 g, 2.25 mole) and 2.0 liters of water are combined at a temperature of 25° C. in a glass, 4000-mL reaction kettle fitted with a mechanical stirrer. The mixture is stirred vigorously for 15 to 30 minutes at 25°-30° C. to yield a fluid suspension of finely divided $CaCO_3$. The suspension is filtered and the microparticulated $CaCO_3$ is suspended in 2.0 liters of distilled water. This slurry is stirred vigorously for four minutes then the microparticulated $CaCO_3$ is isolated by filtration. This procedure affords $CaCO_3$, 98% of which has a particle size of one micron or less.

Oleic acid modified $CaCO_3$. The microparticulated $CaCO_3$ is placed in a 4000-mL reaction kettle fitted with a mechanical stirrer. A solution of oleic acid (4.9 g, 0.014 mole) in 1000-mL ethanol containing 0.5 mL water is added and the mixture is stirred gently for 16 hours at 25° C. The product is isolated by suction filtration and is dried in air. The yield is quantitative.

EXAMPLE 2

Stearic acid modified $CaCO_3$. Using stearic acid in place of oleic acid in Example 1, a microparticulated sample of stearic acid modified $CaCO_3$ is obtained in quantitative yield.

EXAMPLE 3

Soybean oil fatty acid modified $CaCO_3$. Using fatty acids derived from soybean oil in place of oleic acid in Example 1, a microparticulated sample of soybean oil acid modified $CaCO_3$ is obtained in quantitative yield.

EXAMPLE 4

High linoleic acid fat mimetic. The process of Example 1 is repeated, but this time a high linoleic acid content fraction (75%) of fatty acids derived from safflower oil is provided in place of the oleic acid.

EXAMPLE 5

To provide a unique, nutritious fat substitute, the high linoleic acid material of Example 4 is further coated following drying, by mixing it with lard in a ratio of two parts of the reaction product to one part of lard and blending until a smooth uniform texture is obtained.

EXAMPLE 6

Cream Cheese. To make an imitation cream cheese, add

| Ingredient | parts |
| --- | --- |
| Water | 53 |
| Calcium Caseinate | 6.7 |
| Buttermilk Powder | 3.9 |
| Emulsifiers | 0.2 |
| Xanthan Gum | 0.2 | and mix three minutes. Blend

| Example 1 fat mimetic | 35.5 |
| --- | --- | and heat to 200° F. while mixing. Hold for one minute. Then cool to 150° F. and add

| Flavor, Acid and Color | 0.5 |
| --- | --- | and mix one minute. Fill, then cool and store.

EXAMPLE 7

Ice Cream. Vanilla ice cream may be prepared by mixing

| Ingredient | parts |
| --- | --- |
| Sugar (10X) | 15.0 |
| Nonfat Dry Milk | 3.9 |
| Salt | 0.4 |
| into Water | 39.0 | for 3 minutes. Then add

| | |
|---|---|
| Example 1 fat mimetic | 28.4 | and heat to 200° F. while mixing. Hold for 1 minute. Cool to 160° F., and add

| | |
|---|---|
| Sugared Egg Yolks | 12.5 |
| Vanilla Extract | 0.8 | and mix 1 minute. Cool and freeze to desired overrun.

EXAMPLE 8

Process Pimento Cheese Food. Processed pimento cheese food may be prepared by melting

| Ingredient | parts |
|---|---|
| Cheddar Cheese | 30 |
| and Swiss cheese | 30 |
| Fat Mimetic of Example 4 | 27 |
| Into this is blended | |
| Dehydrated Pimento | 0.3 |
| and Water | 12.7 | and the mixture is cast into blocks.

EXAMPLE 9

Imitation Sour Cream. An imitation sour cream may be prepared by adding

| | parts |
|---|---|
| Water | 75.8 |
| to Modified Starch | 2.0 |
| Avicel | 1.0 |
| Distilled Monoglyceride | 0.7 |
| and Polysorbate 60 | 0.3 | and mixing three minutes. To this is added

| | |
|---|---|
| Example 1 fat mimetic | 16.5 |
| Condensed Skim Milk | 3.5 | and the mixture mixed three minutes, heated to 195° F., and held five minutes. This may then be cooled to 60° F., and

| | |
|---|---|
| Flavors and Acids | 0.2 | added, followed by filling in the usual process.

EXAMPLE 10

Filled Cream. To make a "filled cream" composition, homogenize about

| | parts |
|---|---|
| Fat mimetic of Example 2 | 30.0 |
| Skim Milk | 69.9 |
| Polysorbate 80 | 0.1 | in a conventional dairy homogenizer.

EXAMPLE 11

Mayonnaise substitute. Mayonnaise substitutes may be prepared by adding

| Ingredient | parts |
|---|---|
| Water | 5.0 |
| to Sugar | 1.5 |
| and Spices | 3.5 | and mixing three minutes. To this is added

| | |
|---|---|
| Salted Egg Yolks | 8.0 | followed by mixing two minutes, adding

| | |
|---|---|
| Example 3 fat mimetic | 40.0 |
| Soybean oil | 40.0 |
| then Distilled Vinegar | 12.0. |

The mixture is blended 3 minutes and passed through a colloid mill set at 60 prior to filling in the usual process.

EXAMPLE 12

Salad Dressing. Salad dressing may be prepared by adding

| Ingredient | parts |
|---|---|
| Water | 29.0 |
| to Sugar | 12.0 |
| and Spices | 4.5 | and mixing three minutes. Then

| | |
|---|---|
| Salted Egg Yolks | 5.5 |
| and Modified Starch | 3.0 | are added and mixed two minutes. To the aqueous mixture are added

| | |
|---|---|
| Example 2 fat mimetic | 15.0 |
| Olive oil | 25.0 |
| then 120 Distilled Vinegar | 6.0. |

The mixture is then mixed three minutes and passed through a colloid mill set at 60 prior to filling in the usual process.

EXAMPLE 13

Low Fat Spread. A table spread may be prepared by emulsifying

| Oil Phase Ingredients | parts |
|---|---|
| Blend of Example 1 fat mimetic and in a ratio 90:10 Corn oil | 59.58 |
| Lecithin | 0.20 |
| Monoglycerides from 5 IV Hydrogenated Soybean Oil | 0.20 |
| Beta-carotene and Vitamin A Palmitate in Corn Oil | 0.005 |
| Flavor | 0.010 | with Aqueous Phase Ingredients

| | |
|---|---|
| Water | 36.865 |
| Salt | 2.00 |

|  |  |
|---|---|
| Whey | 1.00 |
| Potassium Sorbate | 0.10 |
| Phosphoric Acid | 0.04 | and passing the emulsion through a cool scraped surface heat exchanger in the usual process.

EXAMPLE 14

Butter Cream Icing. Butter cream icing may be prepared by blending:

|  | parts |
|---|---|
| Sugar | 227.0 |
| Example 5 fat substitute | 24.0 |
| Soybean oil (I.V. 78) | 10.0 |
| Corn Oil | 36.8 |
| Water | 28.4 |
| Nonfat Dry Milk | 14.0 |
| Emulsifier | 1.4 |
| Salt | 1.0 |
| Vanilla | 1.0 |

All of the ingredients are creamed in a mixer at medium speed until the desired consistency is obtained.

EXAMPLE 15

Pet Food. Dry, expanded low caloried dog food kibs may be prepared from the following ingredients:

|  | parts |
|---|---|
| Hominy Feed | 37 |
| 52% Meat Meal | 16 |
| Wheat Shorts | 13 |
| Corn Germ Meal | 9.6 |
| Wheat Germ Meal | 3 |
| Dried Milk | 0.9 |
| Beet Pulp | 1.7 |
| Fish Scrap | 0.5 |
| Salt | 0.5 |
| Vitamins and Minerals | 0.1 |

The ingredients are mixed together and water added to raise the water content to 27%, before extrusion, pelleting, and drying in the usual manner.

Following drying, the following ingredients are sprayed onto the outer surfaces of the pelletized dog food substrate to provide a highly palatable coating:

|  |  |
|---|---|
| Example 5 fat substitute | 16.0 |
| Brewer's Yeast | 0.7 |
| Beef digest | 1.0 |

The above description is for the purpose of teaching the person of ordinary skill in the art how to practice the present invention, and it is not intended to detail all those obvious modifications and variations of it which will become apparent to the skilled worker upon reading the description. It is intended, however, that all such obvious modifications and variations be included within the scope of the present invention, which is defined by the following claims.

What is claimed is:

1. A food product comprising:
   a fat mimetic composition comprising particulate fat-insoluble inorganic material selected from the group consisting of calcium carbonate, magnesium carbonate, magnesium hydroxide, magnesium trisilicate, aluminum silicate, monocalcium phosphate, dicalcium phosphate, tricalcium phosphate, titanium dioxide, aluminum oxide, alumina trihydrate, and mixtures of any of these, where the particulate fat-insoluble inorganic material has an average particle size of less than 50 microns, and is coated with an edible fatty material, and
   an oil phase in which the fat mimetic composition is suspended.

2. A food product according to claim 1 wherein the average particle size is greater than 0.005 microns.

3. A food product according to claim 2 wherein the average particle size is within the range of 0.1 to 5.0 microns.

4. A food product according to claim 3 wherein the average particle size is within the range of from 0.1 to 4.0 microns.

5. A food product according to claim 1 wherein the edible fatty material is a member selected from the group consisting of monoglycerides, diglycerides, acetylated monoglycerides, acetylated diglycerides, triglycerides, free fatty acids, sucrose polyesters, fatty carboxy/carboxylate esters, neoalkyl triol fatty acid esters, and mixture of any of these.

6. A food product according to claim 1 wherein the particulate fat-insoluble inorganic material comprises calcium carbonate and the fatty material comprises free fatty acids.

7. A food product according to claim 6 wherein the free fatty acids are derived from natural or hydrogenated triglycerides selected from the group consisting of soybean, sunflower, peanut, safflower, olive, sesame, rice bran, canola, babassu, coconut, palm kernel, palm, rapeseed, cottonseed, corn and butter oils, lard and tallow, and fractions and mixtures of these.

8. A food product according to claim 7 wherein the free fatty acids comprise a mixture containing at least 25% stearic acid.

9. A food product according to claim 1 wherein the oil phase comprises a normally liquid vegetable oil.

10. A food product according to claim 1 wherein the oil phase has a caloric content of less than 8 kilocalories per gram.

11. A food product according to claim 10 wherein the oil phase has a caloric content of from 0.5 to 6.5 kilocalories per gram.

12. A food product according to claim 1 wherein the fat mimetic has a caloric content of less than 1 kilocalorie per gram.

13. A food product according to claim 12 wherein the fat mimetic has a caloric content of less than 0.5 kilocalories per gram.

14. A food product according to claim 1 wherein at least 90% by weight of the particles comprises primary particles.

15. A food product according to claim 14 wherein the fat-insoluble inorganic material comprises calcium carbonate and the fatty material is at least 90% eighteen carbon fatty acids and the caloric content of the fat mimetic is less than 0.5 kilocalories per gram.

16. A method of preparing a reduced calorie food product having an edible fat component, said method comprising:
   blending vegetable or animal fat with a fat mimetic composition comprising particulate, fat-insoluble inorganic material selected from the group consisting of calcium carbonate, magnesium carbonate, magnesium hydroxide, magnesium trisilicate, aluminum silicate, monocalcium phosphate, dicalcium phosphate, tricalcium phosphate, titanium dioxide, aluminum oxide, alumina trihydrate, and mixtures of any of these, where the particulate fat-insoluble inorganic material has an average particle size of less than 50 microns and is coated with an edible fatty material; and replacing at least 10% of the fat in the preparation of the product with the resulting blend.

17. A method according to claim 16 which further includes the step of cooling the reduced calorie food product.

18. A food product comprising:
    a fat mimetic composition comprising particulate calcium carbonate coated with an edible fatty material, and
    at least one other food ingredient comprising an oil phase,
    wherein the fat mimetic composition is suspended in the oil phase.

19. A food product according to claim 18 wherein the oil phase comprises a normally liquid vegetable oil.

20. A food product according to claim 18 wherein the oil phase has a caloric content of less than 8 kilocalories per gram.

21. A food product according to claim 20 wherein the oil phase has a caloric content of from 0.5 to 6.5 kilocalories per gram.

22. A method of preparing a reduced calorie food product having an edible fat component, said method comprising: blending a fat mimetic with a vegetable or animal fat to replace at least 10% of the weight of the fat, said fat mimetic comprising particulate calcium carbonate coated with an edible fatty material.

* * * * *